Oct. 30, 1956　　　G. T. KOEHLER　　　2,768,806
FLUID CONTROL VALVES
Filed May 6, 1952
FIG. I
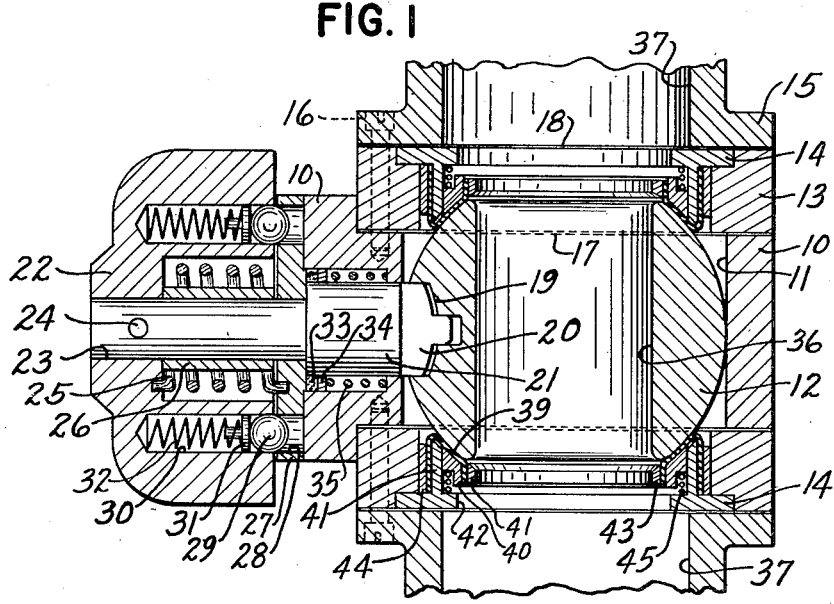
FIG. 2
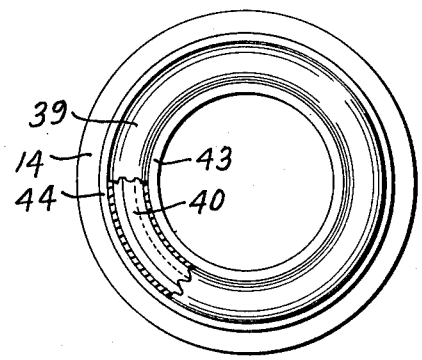
FIG. 3
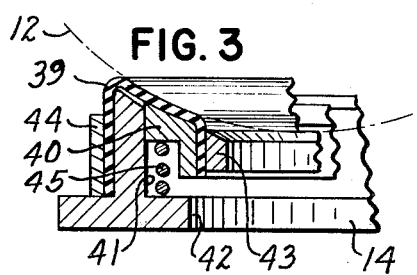
FIG. 4
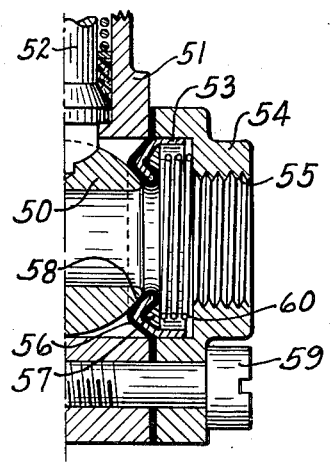
INVENTOR
GORDON T. KOEHLER
BY
*Richard Van Buscum*
HIS ATTORNEY.

United States Patent Office 2,768,806
Patented Oct. 30, 1956

2,768,806

FLUID CONTROL VALVES

Gordon Topie Koehler, Dayton, Ohio, assignor to The Koehler Aircraft Products Company, Dayton, Ohio, a corporation of Ohio Application May 6, 1952, Serial No. 286,329

2 Claims. (Cl. 251—174)

This invention is directed to fluid flow control valves and is particularly concerned with an improved type of removable seat for use in connection with valves of the ball type.

One object of the present invention is the provision of an improved type of valve for controlling the flow of fluids.

Another object of the present invention is to provide a self-contained seat element for use in ball type valves, said seat element being removable as a unit whenever necessary or desired.

A further object is the provision of a self-contained seat element or unit for use in ball type fluid valves, said element having a yieldable sealing portion, made of comparatively thin sheet material or impregnated fabric.

With these and incidental objects in view, the invention includes certain novel features of construction and combinations of parts, a preferred form or embodiment of which is hereinafter described with reference to the drawings which accompany and form a part of this specification.

In the drawings:

Fig. 1 is a cross-sectional view of a ball type valve having incorporated therein applicant's novel removable seat element.

Fig. 2 is a top plan view of the removable seat element.

Fig. 3 is an enlarged section of a fragment of the removable seat element.

Fig. 4 is a fragmentary sectional view of a valve incorporating a modified form of a removable seat unit.

Description

The invention is directed to a fluid flow control valve which comprises a main body portion 10 (Fig. 1) having a bore 11 therethrough large enough to freely receive the outside diameter of a ball-type valve member 12. The periphery of the valve member 12 is arranged to be yieldingly engaged by the spring-loaded sealing medium of a removable seat element 14, in the present instance there being two such seat elements 14, diametrically opposed and mounted in suitable bores and counterbores in a seat retainer 13 which, together with a corresponding cap portion 15 is secured to the body 10 by suitable screws 16. Sealing washers or gaskets 17 and 18 are provided between the retainer 13 and the body 10 and between said retainer and the cap 15 to seal said parts against leakage.

The ball 12 has a clutch cut 19 arranged to receive a tenon 20 on the lower end of a valve operating stem 21, an enlarged portion of which is journaled in a bore in the body 10 and a reduced upper portion of which is journaled in a bore in a plate 27 secured by suitable screws to the body 10. The reduced upper end of the stem 21 engages a bore 23 in a turning piece 22 secured to said stem by a pin 24. The stem 21 is sealed against leakage by means of a sealing washer 33 (Fig. 1) which fits snugly around the larger diameter of said stem and snugly engages the side walls of a counterbore in the body portion 10, which counterbore is concentric with the bore which rotatably supports said stem 21. The sealing washer 33 is maintained in a loaded or sealing condition by a compressible spring 35, said spring being separated from said sealing washer by a pressure washer 34, said washer 34 and said spring fitting loosely around the enlarged portion of the stem 21 and fitting freely within the counterbore for said stem.

Indexing means is provided for indexing the ball valve member 12 from one position to another and for yieldingly retaining said member in selected position.

The indexing means comprises four equally spaced indentions or holes 28 in the plate 27, said holes arranged to be partially engaged by diametrically opposed ball bearings 29 free in bores 30 in the turning piece 22. The ball bearings 29 are maintained in yielding engagement withe the holes 28 by corresponding compressible springs 32 freely mounted in the bores 30 and separated from said ball bearing by pressure studs 31 having tenons which fit freely within the coils of said springs 32. When the valve is in open position, as shown in Fig. 1, the ball 12 is located so that a through bore 36 therein is in alinement with corresponding central holes in the seat elements 14 and corresponding bores 37 in the caps 15. Rotating the turning piece 22 one fourth turn or 90 degrees, which movement is determined by the engagement of the ball bearings 29 with the corresponding holes 28 in the plate 27, moves the ball valve member 12 from open position, as here shown, to closed position, in which the bore 36 is at right angles to the central openings in the seat elements 14, and the bores 37 in the caps 15, to close said valve.

The removable seat element comprises the main bushing like portion 14 (Figs. 1, 2 and 3), which as previously explained, fits freely in a corresponding bore and counterbore in the retainer 13, which is in turn secured to the body 10. Each of the seat elements likewise comprises a sealing element or membrane 39, which coacts with the periphery of the ball 12 to seal the valve against leakage, said sealing membrane being made of any suitable material, such as comparatively thin synthetic rubber sheeting or fabric impregnated with synthetic rubber. The sealing membrane 39 fits over the incurved or concave face of a bushing or pressure or seat ring 40, the outside diameter of which is a slip-fit in a counterbore 41, which is in concentric alinement with a central bore 42 in the bushing 14. The sealing membrane 39 is retained in fixed engagement to the ring 40 by a retaining ring or collar 43, which impinges said membrane against the internal circumference of said ring 40. The membrane 39 fits over an extending central portion of the bushing 14 and is secured in fixed relationship thereto against the outside diameter of said extending portion by a band 44 which binds said membrane or sheet material against said extension. A compressible spring 45 fits freely in the counterbore 41 and is compressed between the shoulder formed by said counterbore and the bore 42, and a shoulder formed by an undercut portion of the ring 40, to force said ring upwardly and thus maintain the membrance 39 in yielding engagement with the periphery of the ball 12 to form a yieldable sealing medium, which is maintained in leak-proof engagement with the periphery of said ball member 12.

It is to be understood that the valve seat membrane or sealing material, which may be made of synthetic rubber sheet material or fabric material impregnated with synthetic rubber or some such suitable material, is maintained in leak-proof engagement with the periphery of the ball valve member 12 by the spring-loaded pressure ring 40, said ring having its inner face concave to match the circumference of said ball member 12. It is likewise to be noted that the extending portion of the bushing 14, around which the sealing material 39 is wrapped (see Figs. 1 and 3), also has the surface thereof adjacent the ball member 12, incurved or concave to match the contour of said ball. However, this concave surface on the bushing 14 is undercut sufficiently to provide a slight amount of clearance between the sealing material 39 and the ball 12, so as not to interfere with the turning of said ball member, and thus create unnecessarily hard operation of the valve.

It will be noted by referring to Fig. 1 that in case it is necessary or desirable to remove the self-contained seat elements 14, all that is required is the removal of the screws 16, thus disconnecting the retainer 13 from the body portion 10 and from the cap portion 15, after which it is a simple matter to readily remove and replace the seat elements 14, thus making it possible to quickly and efficiently remedy malfunctioning of the valve due to defective seat elements 14.

The type of valve illustrated herein is particularly well suited for use in controlling the flow of highly volatile liquid fuels, such as aromatic or high octane gasoline, and is well adapted for use in connection with aircraft for controlling the flow of such fluids from the storage tanks to the supply tanks of the aircraft and from the supply tanks to the engines. From past experience, there is no doubt that the ball type of valve member is best suited for this particular use because it is comparatively easy to operate, even in the larger sizes of valves, and because it has superior leak-proof qualities, all of which are very important in a valve for use in connection with aircraft. Likewise applicant's novel removable seat unit further enhances the value of the ball type valve by making it possible to quickly and efficiently repair said valve by simply removing and replacing defective seat units, all of which may be done upon short notice, and in a minimum of time and by an average mechanic who knows how to use simple tools. This is very important; for example, when the valve is used in connection with either commercial or military aircraft, and it seems logical to conclude that applicant's improved fuel valve fulfills a need which heretofore had not been fulfilled.

The ease of operation of applicant's improved ball type fluid valve, even in the larger sizes, makes it entirely feasible to provide said valve with a return spring mechanism which automatically returns the valve from open to closed position, when the turning piece 22 (Fig. 1) is released. This returning or restoring mechanism comprises a torsion spring 25, which is free in the counterbore in the turning piece 22 and which freely encircles a bushing 26 free on the small diameter of the stem 21. Opposite ends of the torsion spring 25 are bent over and engage corresponding retaining holes in the plate 27 and in the bottom of the counterbore in said turning piece 22.

Any suitable form of stop mechanism (not shown), may be provided for coacting with the turning piece 22 to limit the movement of said turning piece within an angle of 90 degrees, or one-quarter turn, and in this case the return spring 25 would be tensioned to urge and retain said turning piece and the ball valve member 12 against the portion of the stop, corresponding to the closed position of said valve. Therefore, when the turning piece 22 is operated to turn the ball member 12 one-quarter turn from closed to open position, which open position is determined by the portion of the stop corresponding thereto, the spring 25 would be wound up or tensioned, and upon release of said turning piece 22, said spring would automatically return the valve member 12 to closed position.

Figure 4 illustrates a fuel valve incorporating a modified form of applicant's novel removable seat unit. The valve of the modified form comprises a ball-type member 50, similar in every respect to the member 12 of the preferred form, said ball member being freely supported in a through bore in a body portion 51 of the valve. The ball member has a clutch cut in the upper portion thereof, which is engaged by a tenon on the lower end of a stem 52 which is rotatably supported in an upward extension of the body portion 51. Suitable sealing means between the body portion and the upper end of the stem 52 is provided for preventing leakage between these parts. The periphery of the ball 50 coacts with a removable seat unit comprising a bushing 53, which is a free sliding fit in a counterbore in a cap portion 54 secured to the body 51 by suitable screws 59. The counterbore in the cap 54 is in axial alinement with a corresponding bore 55, which is threaded to receive suitable fittings for either pipe or tubing.

The sealing medium for the modified form of valve shown in Fig. 4 is similar in every respect to the sealing medium for the preferred form, and comprises a thin sheet or membrane 56 of sealing material, such as fabric impregnated with synthetic rubber material or other suitable substance. The sealing membrane 56 is directed around an inner lip formed on the bushing 53 and is retained against said lip by a retaining ring or collar 57 which is a press-fit in the inside circumference of said bushing 53. The membrane 56 is guided around the lip on the bushing 53 and continues around an angular sealing surface 58, formed on the inner end of said bushing, and then said membrane is extended to form a sealing medium between the outer face of the body 51 and the inner face of the cap 54, as here shown. A compressible spring 60 (Fig. 4), which is compressed between the retaining ring 57 and the bottom of the counterbore in the cap 54, urges the bushing 53 inwardly to normally maintain the sealing surface 58 of the membrane 56 in firm yielding contact with the periphery of the ball 50 to form an effective and efficient seat unit for use in connection with valves for controlling the flow of highly volatile fuels. Like the seat unit of the preferred form, the seat unit 53 of the modified form may be quickly and easily removed for replacement by the simple expedient of removing the screws 59, which frees the cap 54, for removal from the body 51, after which the unit 53 may be quickly removed from the counterbore in said cap and immediately replaced with another similar seat unit in good repair.

If desired the membrane 56 (Fig. 4), may be vulcanized, cemented or attached in some other suitable manner to the inner face of the cap 54 to further insure that the parts of the seat unit remain as an intact and complete unit when disassembled from the valve.

While the form of mechanism herein shown and described is admirably adapted to fulfill the objects primarily stated, it is to be understood that it is not intended that the invention shall be confined to the particular embodiment disclosed herein, but rather that it shall extend to all structures employing the principles taught in this application.

What is claimed is:

1. A removable seat for a fluid valve, comprising a bushing-like main portion having a central bore and a corresponding counterbore, said bushing constructed and arranged to be removably mounted in the valve; a valve seat ring slidably supported in the counterbore in the bushing; a comparatively thin membrane of uniform thickness fitting over the seat ring and coacting therewith to form a leakproof valve seat; a collar to secure the membrane to the inner circumference of the seat ring; a band to secure the membrane to the outer circumference of the bushing; and yieldable means intermediate the seat ring and the bottom of the counterbore to maintain pressure on the portion of the membrane that forms the valve seat to provide a self-contained valve seat unit.

2. In a valve for controlling the flow of fluids, the combination of a main body portion having a hollow interior; a ball-type valve member mounted in the hollow interior; and a valve seat unit removably mounted in the main body portion and coacting with the periphery of the ball member to control the flow of fluid through the valve, said seat unit comprising a bushing-like main portion having a central bore and a corresponding counterbore, a seat ring slidably mounted in the counterbore, a sheet of sealing material of uniform thickness fitting over the seat ring, a collar to secure the sealing material to the inside circumference of the seat ring, a band to secure the sealing material to the outside circumference of the bushing, and a spring compressed between the bottom of the seat ring and the bottom of the counterbore to cause said ring to maintain the portion of the sealing material fitting thereover in yieldable and leakproof contact with the periphery of the ball member to form an effective fluid seal.

References Cited in the file of this patent

UNITED STATES PATENTS

| | | |
|---|---|---|
| 2,404,816 | Snyder | July 30, 1946 |
| 2,417,400 | Snyder | Mar. 11, 1947 |
| 2,471,941 | Downey | May 31, 1949 |
| 2,520,288 | Shand | Aug. 29, 1950 |
| 2,548,128 | Snyder | Apr. 10, 1951 |
| 2,605,994 | Borchardt | Aug. 5, 1952 |
| 2,698,731 | Koehler | Jan. 4, 1955 |

FOREIGN PATENTS

| | | |
|---|---|---|
| 600,405 | Great Britain | 1948 |